United States Patent [19]

Belcher et al.

[11] Patent Number: 5,557,617
[45] Date of Patent: Sep. 17, 1996

[54] FREQUENCY DIVISION SWITCHING USING RF BUSS

[75] Inventors: Donald K. Belcher, West Melbourne; Earl B. Knick, Melbourne; Andrew T. Powshok, Indian Harbour Bch, all of Fla.

[73] Assignee: Harris Corporation, Melbourne, Fla.

[21] Appl. No.: 393,832

[22] Filed: Feb. 24, 1995

[51] Int. Cl.⁶ .................. H04J 1/04; H04J 1/06
[52] U.S. Cl. .......................... 370/120; 370/121
[58] Field of Search .................. 370/120, 121, 370/123, 70, 124, 75, 76, 57, 95.1, 95.3, 104.1; 455/17, 21, 22, 314, 207; 375/222

[56] References Cited

U.S. PATENT DOCUMENTS

| | | | |
|---|---|---|---|
| 3,364,311 | 1/1968 | Parker | 370/120 |
| 4,429,418 | 1/1984 | Hooper | 455/314 |
| 4,509,198 | 4/1985 | Nagatomi | 455/3.2 |
| 4,707,832 | 11/1987 | Glenn et al. | 370/124 |
| 4,866,787 | 9/1989 | Olesen | 455/3.2 |
| 5,039,956 | 8/1991 | Somer | 375/222 |
| 5,121,409 | 6/1992 | Goss | 375/200 |
| 5,134,615 | 7/1992 | Freeburg et al. | 370/95.3 |
| 5,175,882 | 12/1992 | Higashijima | 455/234.1 |
| 5,274,626 | 12/1993 | Hotta et al. | 370/31 |
| 5,297,136 | 3/1994 | Soprano et al. | 370/50 |
| 5,299,192 | 3/1994 | Guo et al. | 370/70 |

Primary Examiner—Douglas W. Olms
Assistant Examiner—Min Jung
Attorney, Agent, or Firm—Rogers & Killeen

[57] ABSTRACT

A system and method for isolating a data or circuit signal, where the circuit signal has been frequency spread modulated with other such signals onto a beam signal and which beam signal has been frequency spread modulated onto an IF signal, using a buss for providing the entire IF signal to a bank of frequency agile tuning demodulators. Plural IF signals may be processed simultaneously where each tuning demodulator has access to each IF signal via a plurality of IF busses. Each tuning demodulator is capable of isolating any circuit signal from any IF signal.

23 Claims, 5 Drawing Sheets

FREQUENCY DIVISION SWITCHING USING RF BUSS

BACKGROUND OF THE INVENTION

The present invention is related generally to the switching and demodulating of complex signals which include plural independent subchannels and in particular to a system and method of using an IF buss to simultaneously provide a complex RF signal for demodulation by a set of plural demodulators.

As the capability of processing RF signals which carry data has increased, so has the complexity and the amount of information carried by such signals. Often present communications systems utilize an RF signal which includes plural IF signals appropriately combined together (as, for example, by frequency modulation) and in which each of the IF signals includes plural (perhaps thousands) of independent baseband signals (such as encoded voice signals) which are themselves appropriately combined together (as, for example, by frequency modulation). For example, in a proposed communications system, as illustrated in FIG. 1, a beam signal 10 may include plural data or circuit signals 16, each of the data signals 16 containing voice data (or other data suitable for digital transmission). By known techniques, each of the data signals 16 may be modulated by independent subcarriers which are selected to be spaced sufficiently apart from other subcarriers so that the modulated data signals do not overlap (or interfere) with each other. Plural of such beam signals 10 may, in turn, be modulated onto an RF signal 14 by, for example, frequency multiplexing each of the beam signals to separate portions of the signal spectrum of the RF signal 14. Circuit guard bands 12 and/or beam guard bands 18 may be spaced between adjacent beam signals 10 and/or data signals 16, as is well known in the art. The size of the guard bands may be as needed for the particular signals being used.

As shown in FIG. 2, the invention may be used in a satellite communication system where plural circuit (data) signals 16 (e.g. telephone conversations) are transmitted to a satellite 20 where they are frequency spread modulated onto a beam signal 10 as shown in FIG. 1. Plural such beam signals 10 are frequency spread modulated onto a RF signal 14, as shown in FIG. 1, which in turn is transmitted to a ground station 30 on Earth. The ground station 30 downconverts the RF signal 14 into an IF signal 15 for transmission over a medium such as coaxial cable or any other suitable medium. The ground station 30 must then demodulate the IF signal 15 into its individual circuit signals 16 for integration into a terrestrial telephone network. It is noted that the ground station 30 also receives circuit signals 16, modulates them onto an RF signal 14, and transmits the RF signal 14 to a satellite 20. Similarly, the satellites receive RF signals 14 and demodulate them into individual circuit signals 16.

Prior art satellite communication systems also used RF signals 14 with plural beam signals 10 frequency spread modulated thereonto, each beam signal 10 in turn having plural circuit signals 16 frequency spread modulated thereonto. As shown in FIG. 3 and in contrast to the present invention, the prior art satellite systems often used switching techniques and fixed frequency demodulators to isolate individual circuit signals 16. In a satellite communication system, a RF signal 14 is usually capable of carrying thousands of circuit signals 16 and a ground station may receive several RF signals 14 simultaneously for processing.

The switching required in the prior art system to route a signal to the proper fixed frequency demodulator is very complex. For example, as shown in FIG. 3, an RF signal 14 received at a ground station may first be downconverted to an IF signal 15 by a conventional downconverter 40. In turn, the IF signal may be applied to a demultiplexor 42 to extract each of the beam signals 10 from within. Each of the beam signals 10 may then be switched by a switch 44 to associate the proper beam signal with its related set of demodulators. Then, the beam signals may be demodulated into individual circuit signals 16 by a set of fixed frequency demodulators 46. Note that any particular demodulator in the prior art system generally receives only a particular beam signal 10 and is fixedly tuned to the carrier frequency of a particular circuit signal. As a result, prior art systems generally require a demodulator for each potential circuit regardless of how many demodulators are actually used. An additional result of the configuration of the prior art system is a limitation of the ability of the communication system to place specific circuit signals within the beam signals, as only the circuit signals associated with the set of particular demodulator frequencies associated with a beam signal may use a particular beam signal.

In the present invention, the entire IF signal 15 may be provided to each demodulator as opposed to the prior art where only a particular beam signal 10 is provided to each demodulator. Each demodulator, in the present invention may be frequency agile, that is, each demodulator may be variably tuned so that it can demodulate any circuit signal 16 from any beam signal 10. The present invention thereby avoids the complicated switching of the prior art, and it also allows for use of fewer demodulators than what would be necessary to handle the maximum traffic of circuit signals 16. This in turn would allow for statistically sizing the number of tuning demodulators in any of several manners known to those skilled in these arts.

For example, if the maximum physical capacity of a system was for 5,000 modulated circuit signals 16 but empirical data shows that only 2,500 circuit signals 16 are received and demodulated at any one time, the present invention could be constructed with only 2,500 frequency agile or tuning demodulators. The prior art system would still require 5,000 demodulators since each particular demodulator is dedicated to a particular beam frequency and a particular circuit frequency. The flexibility of the present invention maximizes resources by allowing for the use of only as many tuning demodulators as are needed.

While the demodulators of the present invention do not need to be frequency agile, some of the benefits of the present invention are lessened without such frequency agile demodulators. For instance, each of the demodulators could be fixedly tuned to a particular beam signal carrier frequency and a particular circuit signal carrier frequency. While this arrangement would have the advantage of obviating the complicated switching of the prior art, it would still require the number of demodulators to be equal to the maximum number of circuit signals 16 able to be modulated onto the RF signal 14.

It is accordingly an object of the invention to obviate these and other disadvantages of the prior art and to provide a novel system and method for isolating in baseband form a modulated circuit signal 16 from a beam signal 10 modulated on an IF signal 15.

It is another object of the invention to provide a novel system for isolating in baseband form a modulated circuit signal 16 from a beam signal 10 modulated on any of plural IF signals 15.

It is a further object of the invention to provide a novel satellite communication system with means for isolating in baseband form a modulated circuit signal 16 from a beam signal 10 modulated on any of plural IF signals 15.

These and many other objects and advantages of the present invention will be apparent to one skilled in the art from the claims and from the following detailed description when read in conjunction with the appended drawings.

DETAILED DESCRIPTION OF THE PREFERRED EMBODIMENTS

Figure 1:
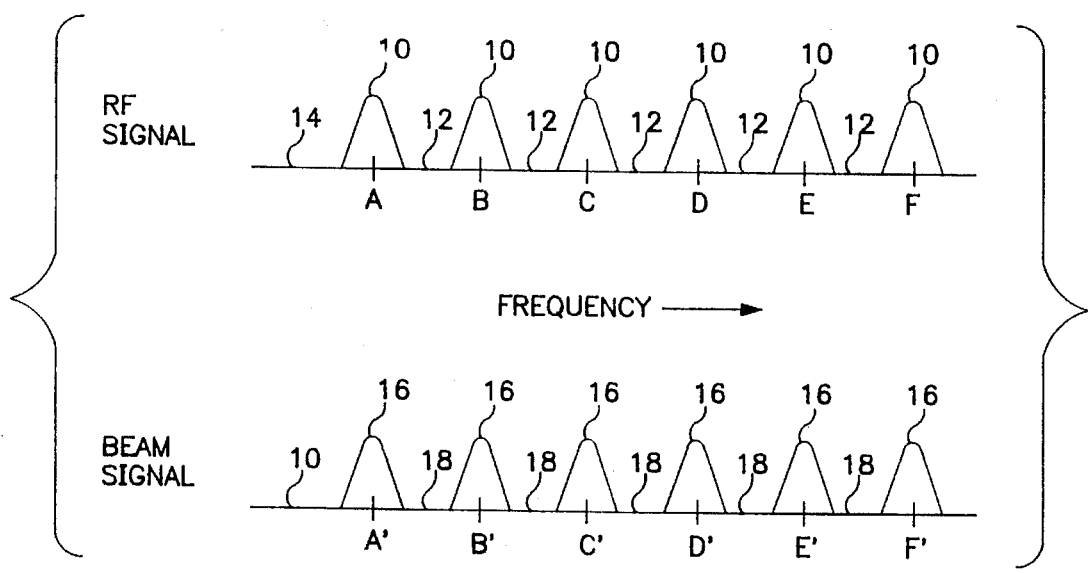
FIG. 1 is a waveform of an RF signal with beam signals 10 frequency spread modulated thereonto, and a representative beam signal 10 with circuit signals 16 frequency spread modulated thereonto.
Figure 2:
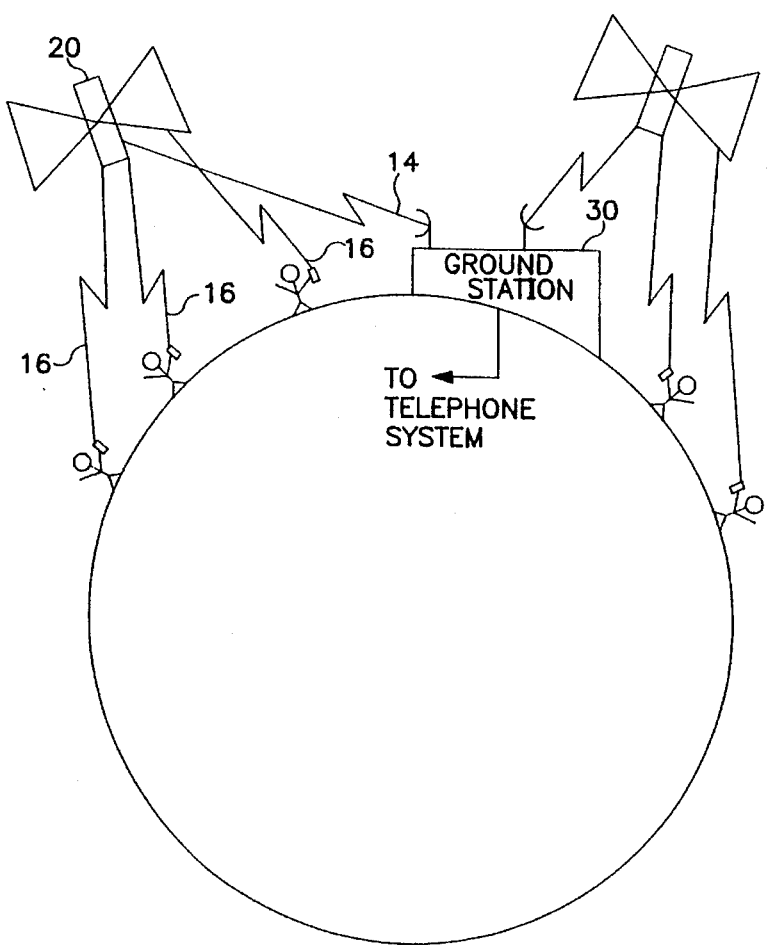
FIG. 2 is a schematic diagram of the type of satellite communication system in which the present invention may be used.
Figure 3:
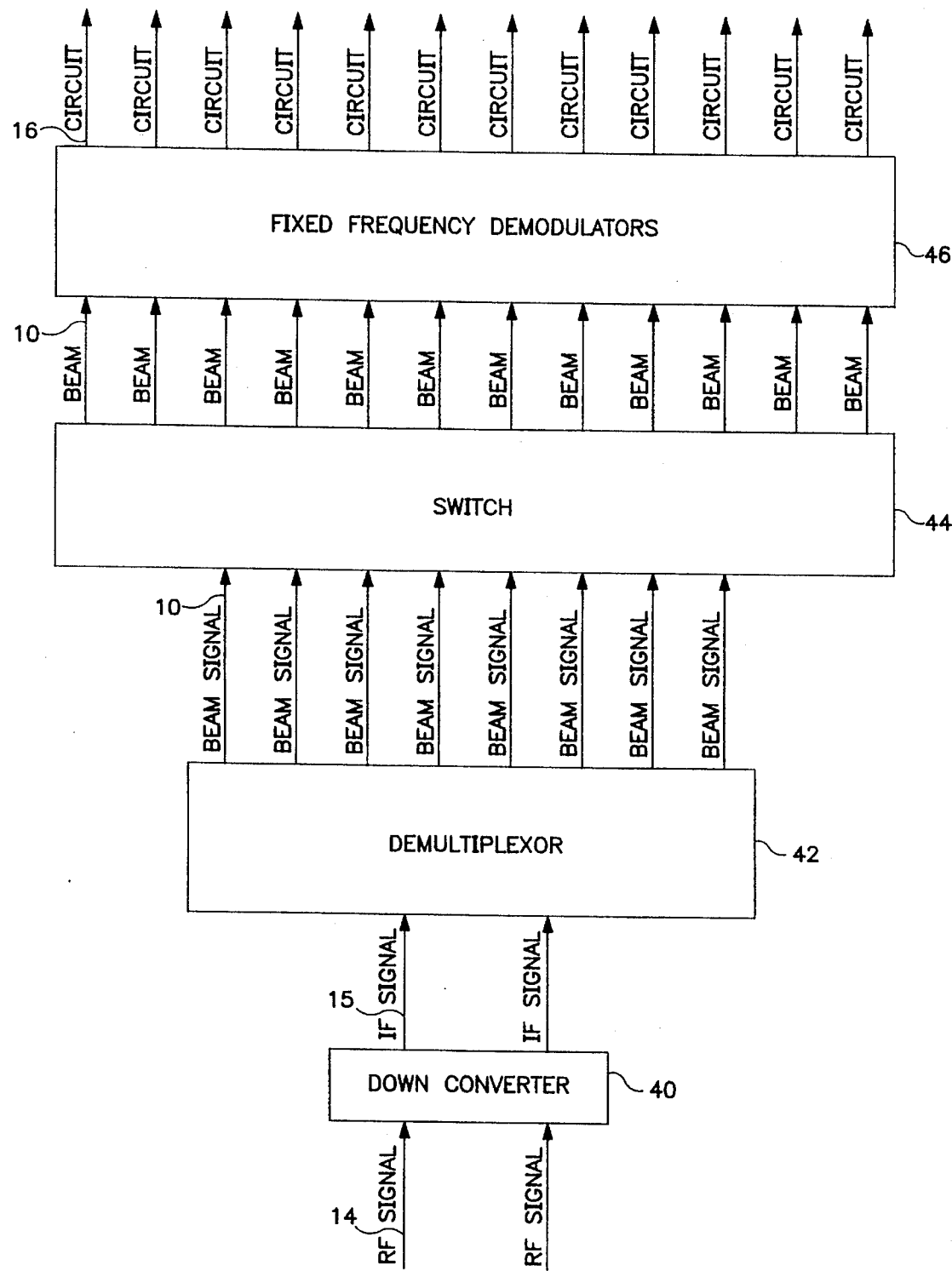
FIG. 3 is a schematic diagram of a prior art communication system for associating beam signals to a terrestrial telephone network.
Figure 4:
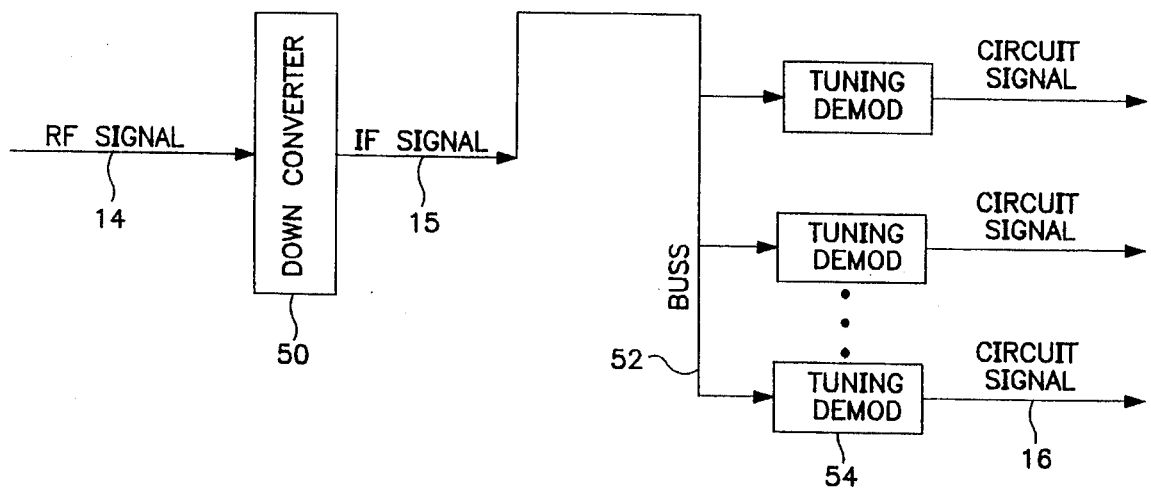
FIG. 4 is a schematic diagram of an embodiment of the present invention wherein a single RF signal 14 is processed using a buss and a bank of tuning demodulators.

With reference to FIG. 4, one embodiment of a system for isolating a modulated circuit signal 16 in baseband form receives an RF signal 14 which is passed to a downconverter 50 which downconverts the RF signal 14 down to an IF signal 15. The resulting IF signal 15 is passed along a buss 52 to plural tuning demodulators 54. Each tuning demodulator 54 is capable of isolating in baseband form any of the beam signals 10 modulated onto the IF signal 15. After a tuning demodulator 54 has selected a beam signal 10, the tuning modulator 54 is further capable of selecting any circuit signal 16 from the selected beam signal 10. The tuning demodulator 54 then passes on the baseband circuit signal 16 for integration into the terrestrial telephone network.

The system of FIG. 4 may be used in a satellite system in which plural satellites communicate simultaneously with a ground station, each satellite communicating on a separate RF frequency. The satellites may be positioned relative to each other so that any portion of the Earth's surface is substantially covered by the footprint of at least one satellite. In such a communication systems plural of the systems of FIG. 4 could be used, one for each RF signal 14 received. The system of FIG. 4 may also be used in any other system requiring the isolation of a circuit signal 16 from a RF signal 14 or an IF signal 15.

Figure 5:
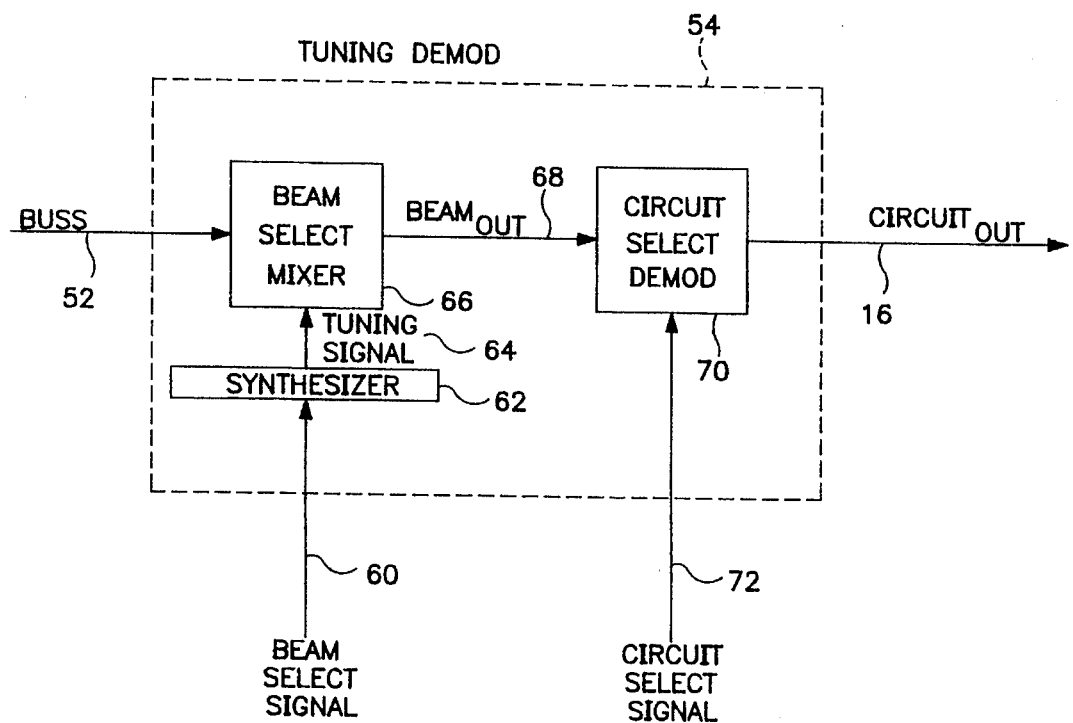
FIG. 5 is a schematic diagram of a tuning demodulator suitable for use in the embodiment of the present invention illustrated in FIG. 4.

With reference to FIG. 5, where like numerals have been used as in FIG. 4 to assist in understanding the invention, the tuning demodulator 54 may first isolate one of the beam signals 10 modulated onto the IF signal 15 by providing a beam select signal 60 to a synthesizer 62. The synthesizer 62 then provides a tuning signal 64 at a frequency responsive to the beam select signal 60, to a beam select mixer 66. The beam select mixer 66, being tuned to the carrier frequency of a particular beam signal 10, isolates the beam signal 68 and passes it on to a circuit select modulator 70. A circuit select signal 72 is also passed to the circuit select demodulator 70 which tunes the demodulator 70 to the carrier frequency of the desired circuit signal 16. Responsive to the circuit select signal 72, the circuit select demodulator 70 isolates the desired circuit signal 16 into baseband form from the isolated beam signal 68 and passes on the baseband circuit signal 16. Appropriate filtering and wave shaping (not shown) may be utilized within the tuning demodulator 54.

Figure 8:
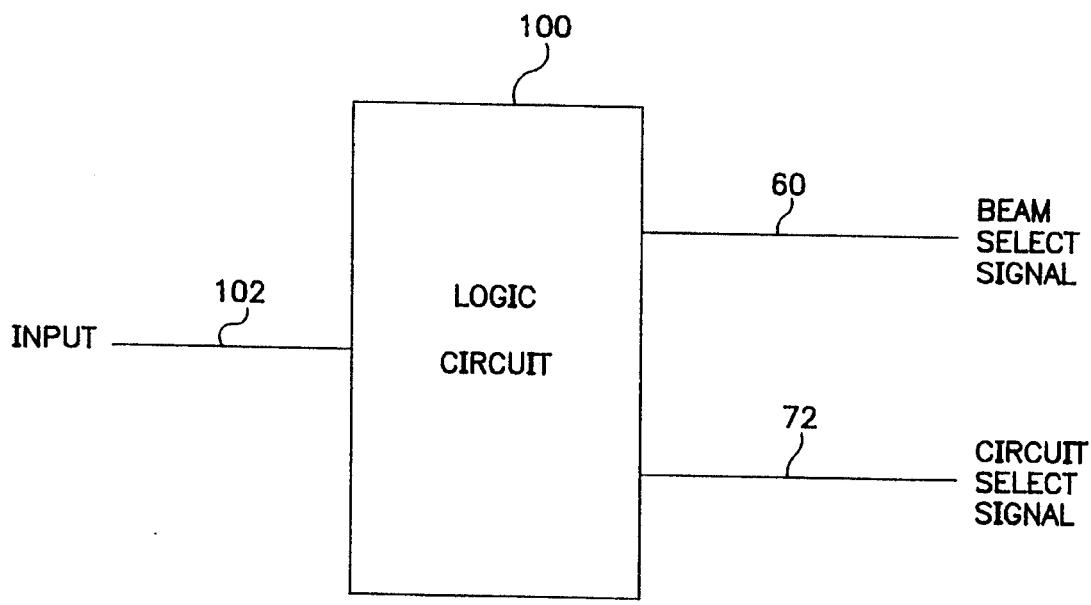
FIG. 8 is a schematic diagram of a logic circuit suitable for use with the tuning demodulator illustrated in FIG. 5.

The beam select signal 60 and the circuit select signal 72 may be provided by one or more logic circuits 100 as shown in FIG. 8 in response to one or more input signals 102. The logic circuit 100 can be a comprehensive logic controller which would determine which circuit signals 16 are active, i.e. currently transmitting data, and would allocate an active circuit signal to each tuning demodulator 54 by sending the appropriate beam and circuit select signals to each of the tuning demodulators 54. Alternatively, each tuning demodulator 54 could be controlled by a separate logic circuit 100 in such a way that a first tuning demodulator 54 demodulates a first active circuit signal 16, a second tuning demodulator 54 demodulates a second active circuit signal 16, and so on until all active circuit signals 16 are demodulated to baseband form.

Figure 6:
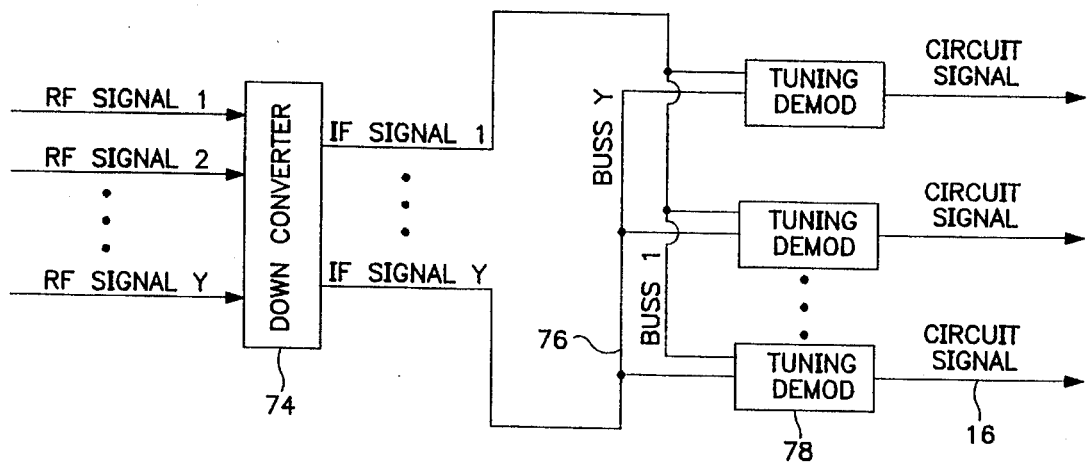
FIG. 6 is a schematic diagram of an embodiment of the present invention wherein plural RF signals 14 are processed using an equal number of busses and a bank of tuning demodulators.

With reference to FIG. 6, in another embodiment of a system of the present invention for isolating a modulated circuit signal 16 in baseband form, the system can process plural RF signals 14 simultaneously. In a typical such system, each RF signal may be generated, for example, by a separate satellite. Each RF signal is modulated to a different carrier frequency so that each may be received simultaneously by a single ground station. Within each RF signal are contained beam signals 10 (and circuit signals) as described earlier. By maintaining the RF signals and their resultant beam signals separately, each RF signal may reuse the same beam frequencies, providing for a greater number of available circuit signals within a single set of beam signal frequencies. Each tuning demodulator 78 is capable of isolating any modulated circuit signal 16 from any IF signal 15.

With continued reference to FIG. 6, a downconverter may select one or more of the RF signals for processing, downconverting the selected signal(s) and applying one of each downconverted signal to one of the IF signal busses 76 (BUSS 1–BUSS Y). Each IF signal 15 is provided by means of the busses 76 to each of the tuning demodulators 78. Each tuning demodulator 78 has access to each IF buss 76 at any one time. Each tuning demodulator is capable of selecting one of the plural IF busses 76, isolating any beam signal 10 therefrom, and further isolating any circuit signal 16 from the isolated beam signal 10.

The system of FIG. 6 may be used particularly in a satellite communication system in which plural satellites are available for use at any one time and the system selects which satellite to use depending on well known factors, such as the quality of the signals being received and the rise and fall times of the satellites with respect to the local horizon. For example, as one satellite being used by the system falls over the horizon, another satellite in view of the ground station can be called upon to take over the circuit signals currently being handled by the first satellite. At the time that the second satellite switches to take over the circuit signals of the first satellite, the downconverter 74 can be switched to route the IF signal from the second satellite onto one of the IF signal busses 74.

Figure 7:
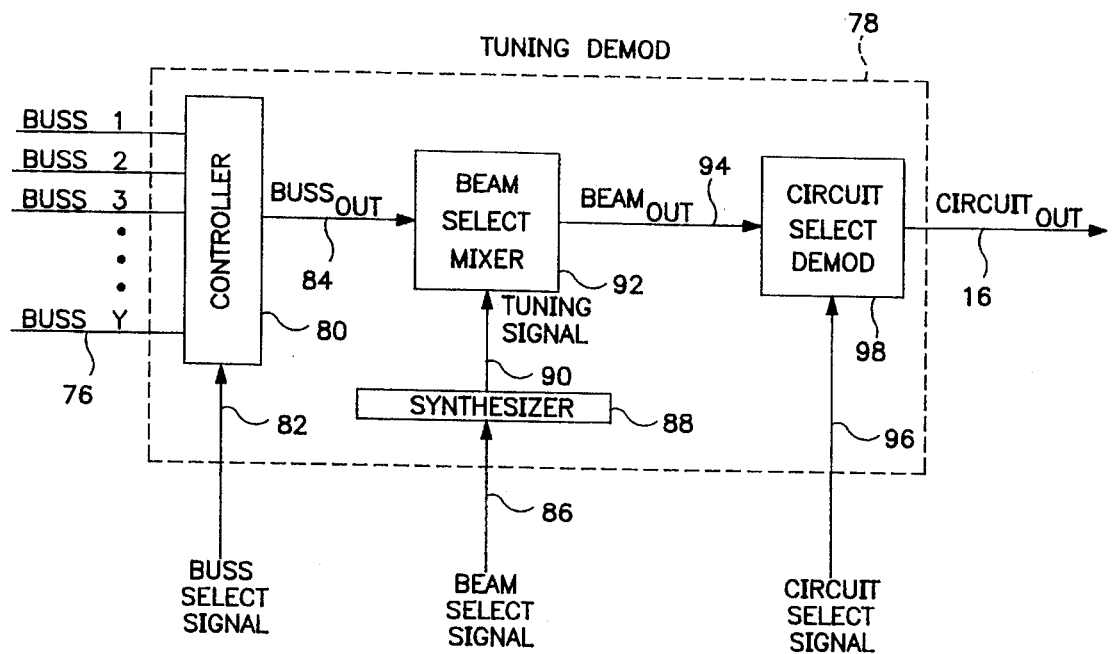
FIG. 7 is a schematic diagram of a tuning demodulator suitable for use in the embodiment of the present invention illustrated in FIG. 6.

With reference now to FIG. 7, where like numerals as those used in FIG. 6 indicate common elements, a tuning demodulator 78 may have the ability to select any of the plural IF busses 76 for demodulation in response to a buss select signal 82. A controller 80 simultaneously receives plural IF signals 15 from plural IF busses 76. A buss select signal 82 is provided to the controller 80. The controller 80 passes one of the plural IF signals to a beam select mixer 92 responsive to the buss select signal 82. In response to a beam select signal 86, a synthesizer 88 provides a tuning signal 90 to the beam select mixer 92 which tunes the beam select mixer 92 to the carrier frequency of the desired beam signal 10. The beam select mixer 92, being so tuned, provides an isolated beam signal 94 to a circuit select demodulator 98. A circuit select signal 96 is also provided to the circuit select demodulator 98 which is thereby tuned to the carrier frequency of the desired circuit signal 16. The circuit select demodulator 98 thus isolates the desired circuit signal 16 from the isolated beam signal 94, and the circuit select demodulator 98 passes on the isolated circuit select signal 16 in baseband form.

Figure 9:
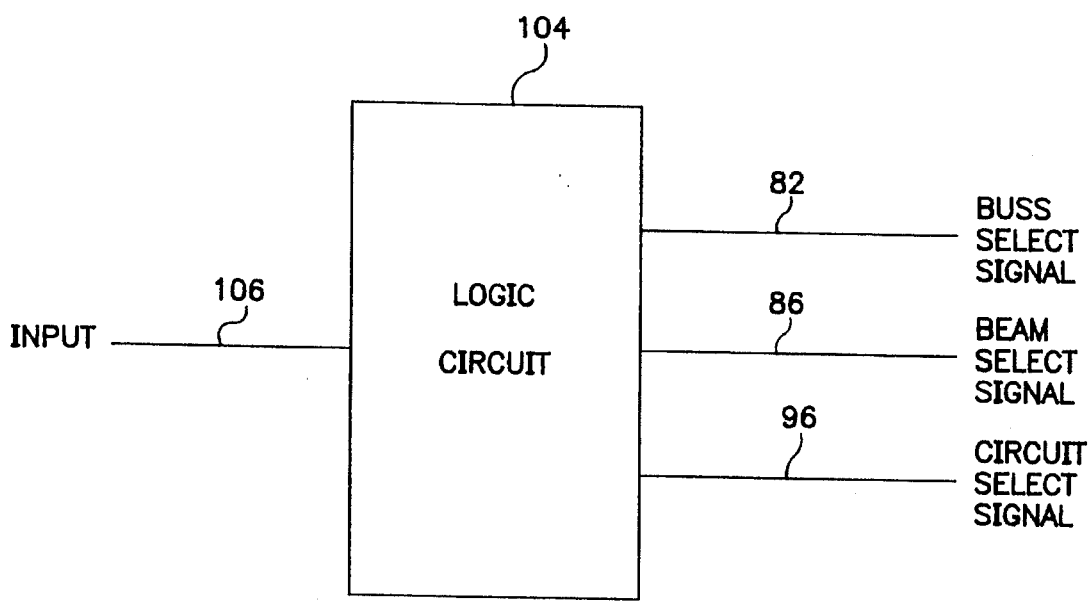
FIG. 9 is a schematic diagram of a logic circuit suitable for use with the tuning demodulator illustrated in FIG. 7.

The buss select signal 82, the beam select signal 86, and the circuit select signal 96 may be provided by a logic circuit 104 as shown in FIG. 9 in response to one or more input signals 106.

It is noted by way of example that the bandwidth of an IF signal may be between about 200 MHz and about 400 MHz, and that there may be between 25 and 45 beam signals frequency spread modulated onto each IF signal.

While preferred embodiments of the present invention have been described, it is to be understood that the embodiments described are illustrative only and the scope of the invention is to be defined solely by the appended claims when accorded a full range of equivalence, many variations and modifications naturally occurring to those skilled in the art from a perusal hereof.

What is claimed is:

1. A system for isolating an individual baseband circuit signal from plural circuit signals frequency spread modulated onto a beam signal which beam signal is frequency spread modulated onto an IF signal with other similarly composed beam signals, the system comprising:

means for providing the IF signal;

plural demodulators, each of said demodulators capable of demodulating any of the beam signals modulated onto the IF signal to a baseband beam signal, and further being capable of demodulating any of the circuit signals modulated onto the baseband beam signal to a baseband circuit signal; and a buss for providing the IF signal to each of said demodulators.

2. The system of claim 1 wherein said demodulators are frequency agile.

3. The system of claim 2 each of said frequency agile demodulators further comprising:

means for receiving a beam select signal which is provided to a frequency synthesizer;

said synthesizer responsive to the beam select signal provides a tuning signal at the desired frequency to a beam select mixer; and said beam select mixer having means for receiving the IF signal and, responsive to the IF signal and the beam select signal, providing the baseband beam signal.

4. The system of claim 3 each of said frequency agile demodulators further comprising:

means for receiving a circuit select signal which is provided to a circuit select demodulator;

the circuit select demodulator having means for receiving the baseband beam signal and, responsive to the circuit select signal and the baseband beam signal, providing the baseband circuit signal.

5. The system of claim 2 further comprising a logic circuit comprising:

means for receiving one or more input signals; and means for, responsive to said input signals, providing one or more control signals to each of said frequency agile demodulators, said frequency agile demodulators providing a baseband circuit signal in response to said control signals.

6. The system of claim 2 where the number of frequency agile demodulators are less than the maximum number of the circuit signals able to be modulated on to the IF signal.

7. The system of claim 6 where the number of frequency agile demodulators are determined by statistical methods.

8. The system of claim 1 wherein the bandwidth of the IF signal is between about 200 MHz and about 400 MHz and there are between 25 and 45 beam signals frequency spread modulated thereonto.

9. A system for isolating an individual baseband circuit signal from any one of plural IF signals each comprising plural beam signals frequency spread modulated thereonto, each beam signal comprising plural circuit signals frequency spread modulated thereonto, the system comprising:

means for providing the plural IF signals;

plural demodulators, each demodulator having means to select one of the plural IF signals, means to isolate a baseband beam signal from the selected IF signal, and means to isolate the baseband circuit signal from the baseband beam signal; and plural busses sufficient for providing each IF signal to each demodulator, each buss providing no more than a single IF signal at any instant to said plural demodulators.

10. The system of claim 9 wherein said demodulators are frequency agile.

11. The system of claim 9 wherein each of said demodulators has means for receiving and is responsive to one or more control signals.

12. The system of claim 11 wherein the control signals further comprise:

a bus select signal, said IF selection means being responsive to the bus select signal;

a beam select signal, said baseband beam signal isolation means being responsive to the beam select signal; and a circuit select signal, said baseband circuit signal isolation means being responsive to the circuit select signal.

13. The system of claim 11 wherein the control signals are provided by a logic circuit comprising:

means for receiving one or more input signals; and means for providing the control signals, the control signals being responsive to the input signals.

14. A satellite communication system for transmitting and receiving data transmitted as circuit signals, the satellite communication system comprising:

signal modulator subsystems, each signal modulator subsystem having means for receiving plural of the circuit signals, means for frequency spread modulating the circuit signals onto each of plural beam signals, means for frequency spread modulating the plural beam signals onto a RF signal;

signal demodulator subsystems, each signal demodulator subsystem having means for receiving one or more RF signals, means for downconverting each RF signal to an IF signal, means for selecting one IF signal, plural demodulators each having means for isolating any beam signal in baseband form from the selected IF signal and having further means for isolating any circuit signal in baseband form from the isolated baseband beam signal, and plural busses for providing each IF signal to every demodulator and each buss providing no more than a single IF signal;

wherein one or more satellites included in said communication system each have at least one signal modulator subsystem, at least one signal demodulator subsystem, a means for transmitting plural circuit signals, a means for transmitting one or more RF signals, and plural communication units having means for sending circuit signals and receiving circuit signals, and one or more ground stations included in said communication system each have at least one signal modulator subsystem, at least one signal demodulator subsystem, a means for transmitting plural circuit signals, a means for transmitting one or more RF signals, and plural communication units having means for sending circuit signals and receiving circuit signals.

15. The satellite communication system of claim 14 wherein said demodulators are frequency agile.

16. The satellite communication system of claim 14 wherein the satellites are positioned relative to each other so that any portion of the Earth's surface is substantially covered by the footprint of at least one satellite.

17. A method of isolating a circuit signal in baseband form from an IF signal comprising plural frequency spread modulated beam signals, each beam signal comprising plural frequency spread modulated circuit signals, the method comprising the steps of:

providing the IF signal to each of plural frequency agile demodulators by means of a bus, each said frequency agile demodulator having a beam select mixer, a synthesizer, and circuit select demodulator;

passing the IF signal to the beam select mixer;

tuning the beam select mixer to the carrier frequency of the desired modulated beam signal by providing a beam select signal to the synthesizer, the synthesizer providing a tuning signal to the beam select mixer in response to the beam select signal, the beam select mixer isolating the desired beam signal in baseband form in response to the tuning signal and the IF signal;

providing the baseband beam signal to a circuit select demodulator; and tuning the circuit select demodulator to the carrier frequency of the desired circuit signal by providing a circuit select signal to the demodulator, the circuit select demodulator isolating the desired circuit signal in baseband form in response to the baseband beam signal and the circuit select signal.

18. The method of claim 17 where plural of the IF signals are provided each on a separate buss first to a buss selector from which a single IF signal is then passed to said beam select mixer the method further comprising the steps of:

providing plural IF signals to each of said frequency agile demodulators via plural busses, each frequency agile demodulator also having a buss selector;

passing plural IF signals to said buss selector;

providing a buss select signal to said buss selector;

selecting a desired IF signal from the plural IF signals in response to the bus select signal; and passing the desired IF signal from said buss selector to said beam select mixer.

19. A method of providing circuit signal communication via satellite comprising the steps of:

transmitting an RF signal from a first station to a satellite, said RF signal comprising plural frequency spread modulated beam signals, and each beam signal comprising plural frequency spread modulated circuit signals;

transmitting said RF signal from the satellite to a second station;

converting said RF signal to an IF signal at the second station;

providing the IF signal to each of plural frequency agile demodulators by means of a buss at the second station; and generating different ones of each of the plural circuit signals at selected ones of the frequency agile demodulators.

20. In a system for isolating an individual baseband circuit signal from plural circuit signals frequency spread modulated onto a beam signal which beam signal is frequency spread modulated onto an IF signal with other similarly composed beam signals, the method of transmitting the circuit signals between first and second stations comprising:

providing the IF signal at a first station and transmitting the IF signal to a second station;

providing plural demodulators at the second station, each of said demodulators capable of demodulating any of the beam signals modulated onto the IF signal to a baseband beam signal, and further being capable of demodulating any of the circuit signals modulated onto each of the baseband beam signals to a baseband circuit signal; and applying the IF signal to each of said demodulators substantially simultaneously by a buss means.

21. The method of claim 20 wherein said demodulators are frequency agile and further comprising the step of tuning each of the demodulators to receive a separate beam signal or circuit signal.

22. The method of claim 21 further comprising the step of applying one or more input signals to a logic circuit means included in the system;

generating one or more control signals at the logic circuit means in response to receipt of the input signals;

applying one or more of the control signals to each of said frequency agile demodulators; and generating a baseband circuit signal at selected frequency agile demodulators in response to receipt of a control signal.

23. The method of claim 21 wherein the provided number of frequency agile demodulators is less than the maximum number of the circuit signals able to be modulated on to the IF signal.

* * * * *